United States Patent
Ren et al.

(10) Patent No.: US 12,019,975 B1
(45) Date of Patent: Jun. 25, 2024

(54) AUTOMATIC WEBPAGE LAYOUT CHECKER: 5D DEEP LEARNING BASED ON UNIQUE RULES FOR COLORING WEB COMPONENT BORDERS AND NON-SPACE

(71) Applicant: MICRO FOCUS LLC, Santa Clara, CA (US)

(72) Inventors: Yi-Qun Ren, Shanghai (CN); Kai Hu, Shanghai (CN); Le Peng, Shanghai (CN)

(73) Assignee: Micro Focus LLC, Santa Clara, CA (US)

(*) Notice: Subject to any disclaimer, the term of this patent is extended or adjusted under 35 U.S.C. 154(b) by 0 days.

(21) Appl. No.: 18/188,138

(22) Filed: Mar. 22, 2023

(51) Int. Cl.
*G06F 40/106* (2020.01)
*G06F 16/958* (2019.01)
*G06F 40/143* (2020.01)

(52) U.S. Cl.
CPC .......... *G06F 40/106* (2020.01); *G06F 16/958* (2019.01); *G06F 40/143* (2020.01)

(58) Field of Classification Search
CPC ..... G06F 40/106; G06F 16/958; G06F 40/143
See application file for complete search history.

(56) References Cited

U.S. PATENT DOCUMENTS

| | | | |
|---|---|---|---|
| 9,773,165 B2 | 9/2017 | Kumar | |
| 10,915,602 B2* | 2/2021 | Nagarajan | G06N 3/08 |
| 11,227,096 B2 | 1/2022 | Ren | |
| 2003/0110449 A1* | 6/2003 | Wolfe | G06F 40/166 |
| | | | 715/236 |
| 2010/0220923 A1* | 9/2010 | Davan | G06V 30/414 |
| | | | 382/164 |
| 2013/0207988 A1* | 8/2013 | Artigue | G06F 9/451 |
| | | | 345/589 |
| 2015/0370763 A1* | 12/2015 | Wang | G06F 40/106 |
| | | | 715/235 |
| 2016/0292275 A1* | 10/2016 | Talton | G06F 16/835 |
| 2020/0125607 A1* | 4/2020 | Maikkara | G06F 16/958 |

(Continued)

FOREIGN PATENT DOCUMENTS

CN 112506600 A 3/2021

OTHER PUBLICATIONS

Althomali et al. "Automated visual classification of DOM-based presentation failure reports for responsive web pages," Software Testing, Verification and Reliability, Jun. 2021, vol. 31, No. 4, article e1756, 50 pages.

(Continued)

*Primary Examiner* — Keith D Bloomquist
(74) *Attorney, Agent, or Firm* — Sheridan Ross P.C.

(57) ABSTRACT

A method includes parsing a data object model associated with a webpage to change an original color scheme for each node of the data object model. Each node corresponds to a display feature of a layout of the webpage. The method also includes generating a modified data object model by replacing the original color scheme for each node with a calculated color scheme, displaying the layout of the webpage using the modified data object model, capturing an image of the layout of the webpage as displayed and detecting any errors in the layout of the webpage. The calculated color scheme assigns a unique color code to each feature of the node based on a position of each feature within the node and based on a position of each node within the data object model.

20 Claims, 15 Drawing Sheets

(56) References Cited

U.S. PATENT DOCUMENTS

2020/0137057 A1* 4/2020 Saha .................. G06F 11/0709
2021/0326515 A1* 10/2021 Joshi ..................... G06V 20/46
2021/0350066 A1* 11/2021 Ren ...................... G06F 40/106

OTHER PUBLICATIONS

Althomali et al. "Automatic Visual Verification of Layout Failures in Responsively Designed Web Pages," IEEE, 2019 12$^{th}$ IEEE Conference on Software Testing, Validation and Verification (ICST), Apr. 2019, 11 pages.

* cited by examiner

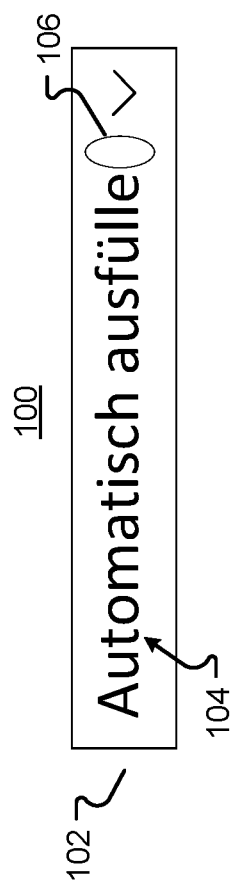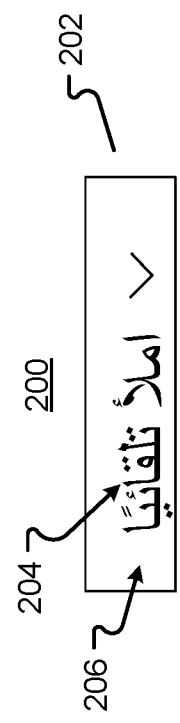

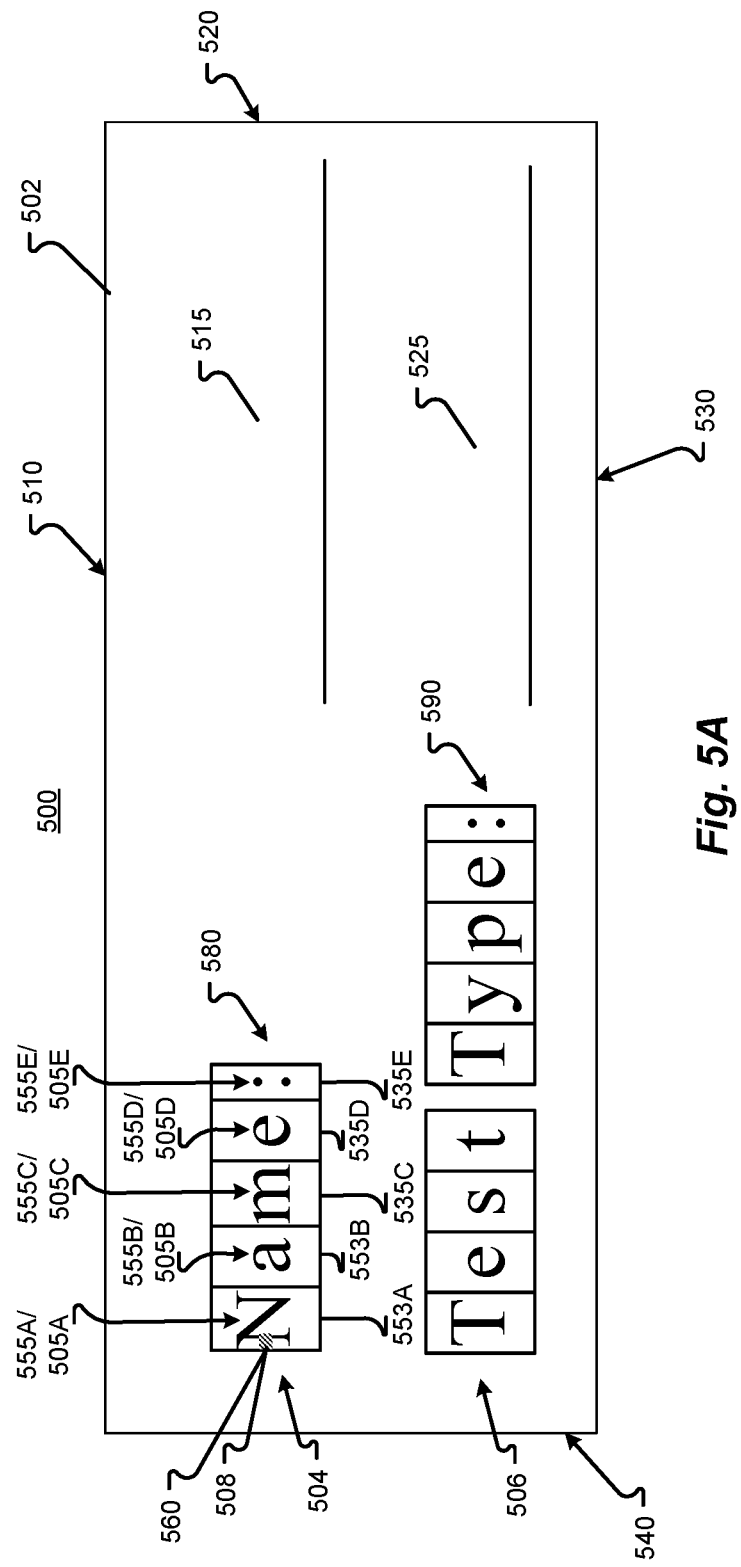

550

```
<div class="maj cols overflow—auto alm-scroll-bar open-direction-container
alm-entity-form-details-view-main-scroll" ng-class="{'alm-entity-form-details-
view-main-scroll' :getShouldScrollContainer()}"
1 style=" border-bottom-color:#8C2B34;
2    border-top-color:#74B47B;
3    border-right-color:#5C4CC2;
4    border-left-color:#44D51A;">
```

```
<span class="field-label parent-ellipsis forward-click-to-
preeditor field-label--required-filed" ng-if=":showLabel" ng-
class="{'field-label--required-field' 'fieldMetadata.required}"
title="Name" disable-automatic-tooltip="">
  ::before
1    <mark style="color:#9ADEAE;background-color:#827606">N</mark>
2    <mark style="color:#6A0E4D;background-color:#529794">a</mark>
3    <mark style="color:#3A2FDB;background-color:#22B833">m</mark>
4    <mark style="color:#0A507A;background-color:#EFD9C1">e</mark>
5    <mark style="color:#D77119;background-color:#BF0960">:</mark>
</span>
```

```
<div class="dropdown-menu rows mf-dropdown-menu" data-aid='dropdown_button_menu>
1 style=" border-bottom-color:#6A6401;
2          border-top-color:#52ED48;
3          border-right-color:#3A858F;
4          border-left-color:#221DD6;">
```

```
<div class="field-editor-preeditor-field-display-value-text" ng-
if=": : !hideFieldLabel" data-aid="field-editor-preeditor-display-value">
1  <mark style="color:#711A64;background-color:#59A3AB">G</mark>
2  <mark style="color:#413B03;background-color:#29C44A">e</mark>
3  <mark style="color:#115C91;background-color:#F6E5D8">n</mark>
4  <mark style="color:#DE7D30;background-color:#C61577">i</mark>
5  <mark style="color:#AE9EBE;background-color:#963616">r</mark>
6  <mark style="color:#7EBF5D;background-color:#6657A4">i</mark>
7  <mark style="color:#4EE0EB;background-color:#697843">c</mark>
8  whitespace
9  <mark style="color:#1E108A;background-color:#0699D1">D</mark>
10 <mark style="color:#EB3129;background-color:#D3BA70">e</mark>
11 <mark style="color:#BB52B7;background-color:#A3DB0F">f</mark>
12 <mark style="color:#8B7356;background-color:#730B9D">e</mark>
13 <mark style="color:#EB94E4;background-color:#432C3C">c</mark>
14 <mark style="color:#2BB583;background-color:#134DCA">t</mark>
15 <mark style="color:#F8D622;background-color:#E06E69">s</mark>
```

*Fig. 6C*

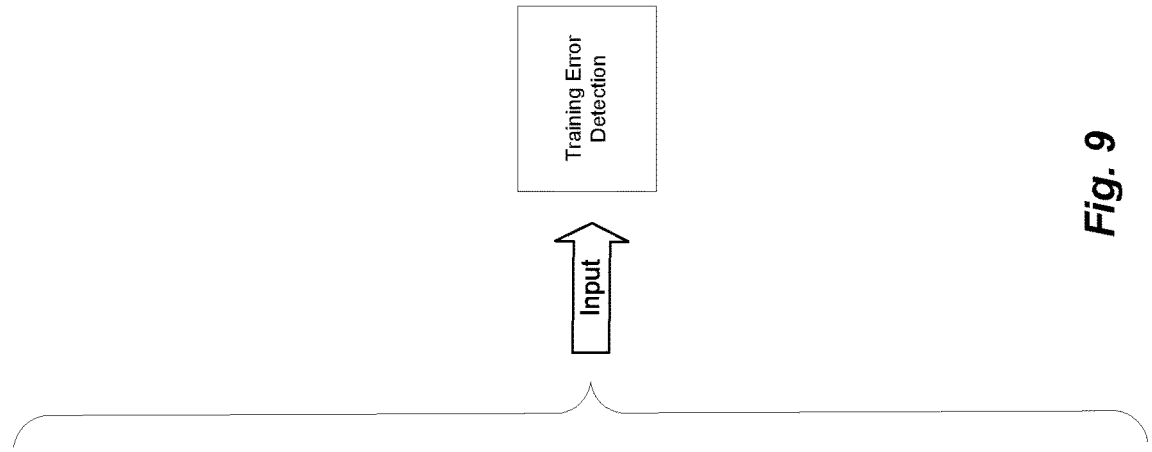

900

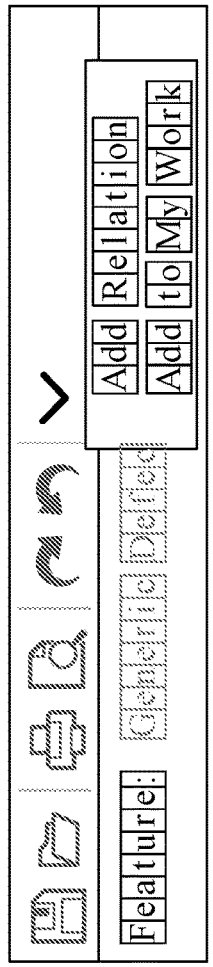

950

Color information for element 1:
Xpath: xxx/xxx/xxx...

```
1  style=" border-bottom-color:#6A6401;
2           border-top-color:#52ED48;
3           border-right-color:#3A858F;
4           border-left-color:#221DD6;">
```

960

Color information for element 2:
Xpath: yyy/yyy/yyy...

```
1   <mark style="color:#711A64;background-color:#59A3AB">G</mark>
2   <mark style="color:#413B03;background-color:#29C44A">e</mark>
3   <mark style="color:#115C91;background-color:#F6E5D8">n</mark>
4   <mark style="color:#DE7D30;background-color:#C61577">i</mark>
5   <mark style="color:#AE9EBE;background-color:#963616">r</mark>
6   <mark style="color:#7EBF5D;background-color:#6657A4">i</mark>
7   <mark style="color:#4EE0EB;background-color:#697843">c</mark>
8   whitespace
9   <mark style="color:#1E108A;background-color:#0699D1">D</mark>
10  <mark style="color:#EB3129;background-color:#D3BA70">e</mark>
11  <mark style="color:#BB52B7;background-color:#A3DB0F">f</mark>
12  <mark style="color:#8B7356;background-color:#730B9D">e</mark>
13  <mark style="color:#EB94E4;background-color:#432C3C">c</mark>
14  <mark style="color:#2BB583;background-color:#134DCA">t</mark>
15  <mark style="color:#F8D622;background-color:#E06E69">s</mark>
```

Input → Training Error Detection

*Fig. 9*

AUTOMATIC WEBPAGE LAYOUT CHECKER: 5D DEEP LEARNING BASED ON UNIQUE RULES FOR COLORING WEB COMPONENT BORDERS AND NON-SPACE

FIELD OF THE DISCLOSURE

The present disclosure is generally directed to systems, methods and apparatus for displaying graphical and textual information, and more particularly to improved systems, methods and apparatus for detecting errors in webpage layouts.

BACKGROUND

Computer programs commonly display graphical and textual information. For example, web browser programs can display webpages specified in markup languages such as the hypertext markup language (HTML). As another example, other computer programs, like application programs, can display information by accessing application programming interface (API)s used by operating systems on which the computer programs run.

A browser extension is a small software module for customizing a web browser. Web browsers typically allow a variety of browser extensions, including user interface modifications, cookie management, ad blocking and custom scripting and styling of webpages. Browser plug-ins can also be used. Browser plug-ins are a separate type of module. The main difference is that extensions are distributed as source code, while plug-ins are distributed as object code.

Conventional techniques for detecting errors in webpage layouts are limited to detecting text string errors and do not address other types of webpage layout errors. Moreover, to address other types of webpage layout errors, complicated algorithms need to be developed and a significant training cost is required for training data for deep learning engines.

Based on the foregoing, there exists a need for improved systems, methods and apparatus for detecting errors in webpage layouts.

BRIEF SUMMARY

Example Aspects of the Present Disclosure Include:

A method includes parsing a data object model associated with a webpage to change an original color scheme for each node of the data object model. Each node corresponds to a display feature of a layout of the webpage and each node includes at least one feature. The method also includes generating a modified data object model by replacing, within the data object model associated with the webpage, the original color scheme for each node with a calculated color scheme. The calculated color scheme assigns a unique color code to each feature of the node, different than an original color code for each feature of the node, based on a position of each feature within the node and based on a position of each node within the data object model. The method further includes displaying the layout of the webpage using the modified data object model, capturing an image of the layout of the webpage as displayed and detecting any errors in the layout of the webpage.

Any of the aspects herein, further including labelling and categorizing any detected errors on the captured image of the layout of the webpage.

Any of the aspects herein, wherein the step of detecting any errors in the layout of the webpage includes failing to identify at least one of the assigned unique color codes on the displayed layout of the webpage or identifying at least one of the assigned unique color codes at an incorrect position on the displayed layout of the webpage.

Any of the aspects herein, further including generating a mapping that associates the assigned unique color code with the position of the feature within the node and the position of the node within the data object model.

Any of the aspects herein, wherein the nodes include web components and text components and wherein the calculated color scheme further assigns a unique color code to each feature of the web component based on the position of the feature within the web component and the position of each web component within the data object model and assigns a unique color code to each feature of the text component based on a position of each character within the text component and a position of each text component within the data object model.

Any of the aspects herein, wherein the detected errors include errors based on at least one text component and errors based on at least one text component and at least one web component.

Any of the aspects herein, wherein each feature of the text component includes a foreground component and a background component and wherein the calculated color scheme further assigns a unique color code to each of the foreground component and the background component of the text component.

Any of the aspects herein, further including providing the labelled and categorized detected errors as input to one or more classifiers of a neural network and receiving as output from the one or more classifiers a report of layout issues from a subsequent data object model associated with a subsequent webpage having similar layout errors identified by the one or more classifiers.

Any of the aspects herein, further including outputting an alert or modifying the layout in an automated manner to correct any errors when any errors have been detected.

A non-transitory computer readable storage medium including instructions that, when executed by at least one processor, cause a computing device to: parse a data object model associated with a webpage to change an original color scheme for each node of the data object model, wherein each node corresponds to a display feature of a layout of the webpage and wherein each node includes at least one feature, generate a modified data object model by replacing, within the data object model associated with the webpage, the original color scheme for each node with a calculated color scheme, wherein the calculated color scheme assigns a unique color code to each feature of the node, different than an original color code for each feature of the node, based on a position of each feature within the node and based on a position of each node within the data object model, display the layout of the webpage using the modified data object model, capture an image of the layout of the webpage as displayed and detect any errors in the layout of the webpage.

Any of the aspects herein, wherein the instructions, when executed by the at least one processor, cause the computing device to label and categorize any detected errors on the captured image of the layout of the webpage.

Any of the aspects herein, wherein the instructions, when executed by the at least one processor, cause the computing device to generate a mapping that associates the assigned unique color code with the position of the feature within the node and the position of the node within the data object model.

Any of the aspects herein, wherein the instructions, when executed by the at least one processor, cause the computing device to: provide the labelled and categorized detected errors as input to one or more classifiers of a neural network and receive as output from the one or more classifiers a report of layout issues from a subsequent data object model associated with a subsequent webpage having similar layout errors identified by the one or more classifiers.

Any of the aspects herein, wherein the instructions, when executed by the at least one processor, cause the computing device to output an alert or modify the layout in an automated manner to correct any errors when any errors have been detected.

A system includes a memory including a data object model of a webpage and computer readable instructions, that when executed by one or more processors, cause the system to perform the steps of: parsing a data object model associated with a webpage to change an original color scheme for each node of the data object model, wherein each node corresponds to a display feature of a layout of the webpage and wherein each node includes at least one feature, generating a modified data object model by replacing, within the data object model associated with the webpage, the original color scheme for each node with a calculated color scheme, wherein the calculated color scheme assigns a unique color code to each feature of the node, different than an original color code for each feature of the node, based on a position of each feature within the node and based on a position of each node within the data object model; displaying the layout of the webpage using the modified data object model; capturing an image of the layout of the webpage as displayed and detecting any errors in the layout of the webpage.

Any of the aspects herein, further including the step of labelling and categorizing any detected errors on the captured image of the layout of the webpage.

Any of the aspects herein, wherein the step of detecting any errors in the layout of the webpage includes failing to identify at least one of the assigned unique color codes on the displayed layout of the webpage or identifying at least one of the assigned unique color codes at an incorrect position on the displayed layout of the webpage.

Any of the aspects herein, further including the step of generating a mapping that associates the assigned unique color code with the position of the feature within the node and the position of the node within the data object model.

Any of the aspects herein, wherein the nodes include web components and text components and wherein the calculated color scheme further assigns a unique color code to each feature of the web component based on the position of the feature within the web component and the position of each web component within the data object model and assigns a unique color code to each feature of the text component based on a position of each character within the text component and a position of each text component within the data object model.

Any of the aspects herein, wherein the detected include errors based on at least one text component and errors based on at least one text component and at least one web component.

BRIEF DESCRIPTION OF THE DRAWINGS

FIG. 1 is a diagram depicting an example of a layout issue that techniques presented herein can detect according to an embodiment of the present disclosure;

FIG. 2 is a diagram depicting another example of a layout issue that techniques presented herein can detect according to an embodiment of the present disclosure;

FIG. 5A illustrates an example layout of a webpage used in detecting errors in the webpage according to an embodiment of the present disclosure;

FIG. 5B illustrates the HTML markup code corresponding to the web component of the example webpage of FIG. 5A;

FIG. 5C illustrates the HTML markup code corresponding to the text component of the example webpage of FIG. 5A;

FIG. 6B illustrates the HTML markup code corresponding to the web component of the example webpage of FIG. 6A;

FIG. 6C illustrates the HTML markup code corresponding to the text component of the example webpage of FIG. 6A;

FIG. 9 illustrates an example snapshot of the layout of the webpage illustrated in FIG. 6A and the corresponding HTML markup codes corresponding to the web and text components illustrated in FIGS. 6B and 6C used in detecting errors in the webpage according to an embodiment of the present disclosure;

Figure 3:
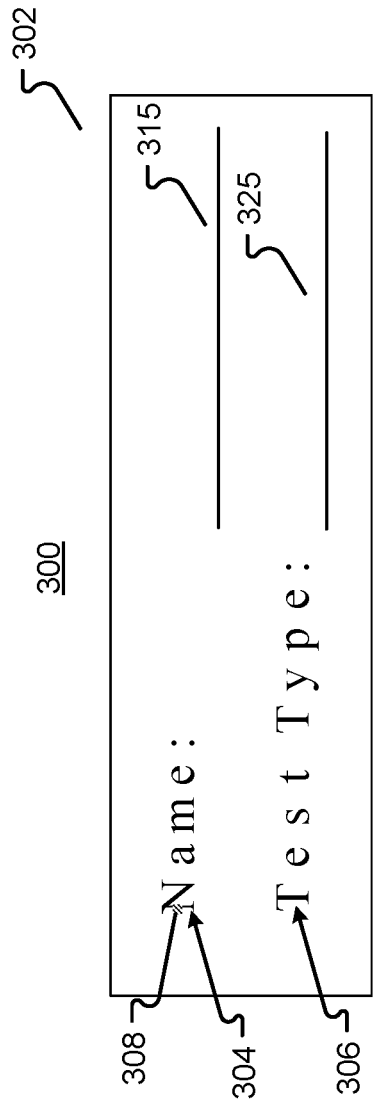
FIG. 3 is a diagram depicting another example of a layout issue that techniques presented herein can detect according to an embodiment of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The presentational layer of a web application consists of a series of webpages, which are rendered by a web browser program on the basis of several resources. An application program developer may first create a Hypertext Markup Language (HTML) document, that specifies the basic display structure of a page. An HTML document consists of a series of HTML features that describe text, images, multimedia, forms, scripts, and other content. Application program developers may associate Cascading Style Sheets (CSS) with an HTML document to specify how a web browser program should graphically style the HTML features when rendering the page. Rules in the CSS can style the size and position of features and can control, for instance, whether the text within them should be rendered in bold face or italic.

A web browser program parses the HTML features in an HTML document, along with the CSS rules, to form the Document Object Model (DOM) of the webpage. The DOM is a tree data structure that represents the visual presentation of the webpage. An application program developer can query or modify the webpage's DOM (and consequently, its visual appearance) through the creation and use of scripts run by the web browser program. An HTML feature's properties, such as its width or height, can be assessed by specifying an eXtensible Markup Language (XML) path expression, known as its XPath. The final arrangement of HTML features on a webpage, as rendered by the web browser program, is referred to as its layout.

As noted in the background section, a wide variety of different types of computer programs commonly display graphical and textual information. The locations at which the HTML features such as text components, including text strings, and web components including graphical components such as user interface features, are displayed, as well as the HTML features themselves, can be referred to as a layout. As discussed above, a layout can be specified in the markup language format for rendering and display by a web browser program or the layout can be hardcoded by a computer program calling operating system-exposed application programming interfaces (APIs).

Different web browser programs may render layouts defined by the markup language specification slightly differently, and likewise different versions of operating systems may render layouts defined by calling their APIs in a slightly different manner. Furthermore, user settings as to font type and size, dots-per-inch (DPI) scaling, and so on, can also affect the rendering and resulting display of layouts. Layout localization from one language to another, such as from English to Mandarin, German, Hebrew, and so on, can also affect the way the layout is rendered for display.

Described herein are techniques for detecting errors in webpage layouts. The errors detected in webpage layouts include errors in web components and text components using unique rules. The technique includes utilizing browser extensions to automatically color visible borders for each web component and color each character of the text component using unique rules having pixels associated with the colored borders for the web components and the colored characters for the text component with 5-dimensional data. The 5-dimensional data includes 2-dimensional data representing the location or coordinate data (e.g., x-components and y-components) for each of the web and text components and 3-dimensional data representing color data (e.g., red, green and blue colors) for each of the web and text components.

A screenshot of the 5-dimensional data for each web component and each text component is taken. The screenshot is later checked and labeled for layout error issues. For example, the location of any layout errors is marked, and a type or category of layout error is identified. The labelled screenshot is further analyzed for extraction purposes and prepared as deep learning data for engine training for deep learning neural networks. After training, the labelled screenshot is used as a model for further webpage layout validity.

Layout issues are a fundamental problem associated with web user interface applications. Typical layout issues include text string character truncation errors, right-to-left text string character rule violation errors, overlapping text string character errors and fake layout issues, for example. FIG. 1 is a diagram depicting an example of a layout issue that techniques presented herein can detect according to an embodiment of the present disclosure.

In FIG. 1, a layout 100 includes a dropdown menu graphical user interface (GUI) feature 102 with the text string "Automatisch ausfülle" 104. The text string 104 is written in the German language and is provided in a German webpage for example. The text string 104 is supposed to represent the German translation of the phrase "Fill In Automatically", but the text string 104 includes an error. The correct German translation of the phrase "Fill In Automatically" is "Automatisch ausfüllen". The letter "n" at the end of the text string 104 has been improperly cutoff or truncated as indicated by the oval 106. This is an example of a text string character truncation error.

FIG. 2 is a diagram depicting another example of a layout issue that techniques presented herein can detect according to an embodiment of the present disclosure. In FIG. 2, a layout 200 includes a dropdown menu GUI feature 202 with the text string "املأ تلقائيًا" 204. The text string 204 is written in the Arabic language and is provided in an Arabic webpage, for example. The text string 204 is supposed to represent the Arabic translation of the phrase "Fill In Automatically", but the text string 204 includes an error. The Arabic word "املأ تلقائيًا" has been improperly reversed: Arabic is written from right-to-left instead of from left-to-right as in English. This is an example of a right-to-left text string character rule violation error, as noted with the reference numeral 206 at the beginning of the text string 204.

Manual detection of these errors can be difficult. A tester that does not know the German or the Arabic language may not be able to detect that the German and Arabic translations include errors and are displayed incorrectly. Moreover, automated detection of these errors via detection of the characters themselves has also proven difficult.

FIG. 3 is a diagram depicting another example of a layout issue that techniques presented herein can detect according to an embodiment of the present disclosure. In FIG. 3, a layout 300 includes a GUI feature 302 including the text string "Name:" 304, the text string "Test Type:" 306 and the graphical feature "■" 308 which represents a shaded square. The layout 300 also includes underline "_____" 315 and underline "_____" 325. The overlapping error in the layout 300 is that the upper-case letter "N" in the text string 304 overlaps with the graphical feature 308. Specifically, the shaded square of the graphical feature 308 overlaps with the first stroke of the character of the text string 304. This is an example of an overlapping text string character error.

Manual error detection techniques may miss this type of error. For instance, the shade rectangle of the graphical feature 308 may be sufficiently small that a tester misses its presence within the text string 304. Moreover, the limited overlap between the text string 304 and the graphic feature 308 may result in a tester failing to recognize this overlapping text string character error. Automated detection of such overlap errors via detection of the characters themselves has also proven difficult. Moreover, there is a strong incentive to develop automatic solutions for checking layout issues because manual error detection techniques are very expensive, especially native manual detection techniques for localized webpages (e.g., German webpages, Japanese webpages, Arabic webpages, etc.).

Figure 4:
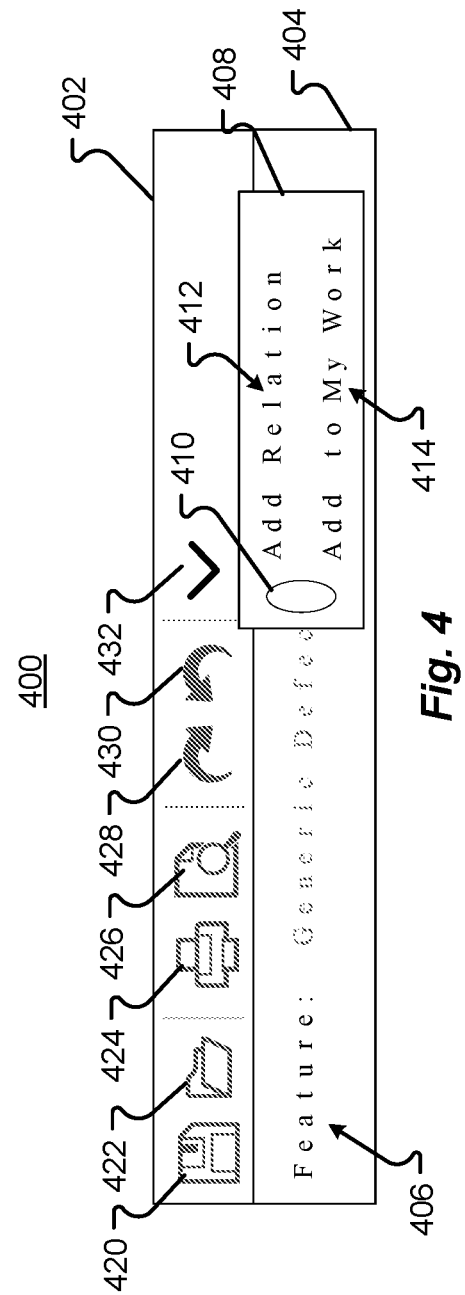
FIG. 4 is a diagram depicting a further example of a layout issue that techniques presented herein can detect according to an embodiment of the present disclosure.

FIG. 4 is a diagram depicting a further example of a layout issue that techniques presented herein can detect according to an embodiment of the present disclosure. In FIG. 4, a layout 400 includes a toolbar 402, a GUI feature 404 and a drop-down window 408. The toolbar 402 includes toolbar icons such as the save icon 420, the folder icon 422, the print icon 424, search icon 426, the forward icon 428, the backward icon 430 and the pull-down icon 432 for the drop-down window 408. The GUI 404 feature includes the text string "Feature: Generic Defec" 406 and the drop-down menu 408 includes the text string "Add. Relation" 412 and the text string "Add to My Work" 408. Text string 406 is partially covered by the drop-down menu 408. The text string should read "Feature: Generic Defects". This error should not be treated as a truncation error as discussed above with FIG. 1, but instead, this error should be treated as a fake layout issue where the text string 406 is partially covered by the drop-down menu 408. In other words, this error involves a text component (i.e., text string 406) and a web component drop-down menu 408).

FIG. 5A illustrates an example layout 500 of a webpage used in detecting errors in the webpage according to an embodiment of the present disclosure. In FIG. 5A, the layout 500 includes a GUI feature 502 including the text string "Name:" 504, the text string "Test Type:" 506 and the graphical feature "■" 508 which represents a shaded square. The layout 500 also includes underline "_____" 515 and underline "_____" 525. The overlapping error in the layout 500 is that the upper-case letter "N" in the text string 504 overlaps the graphical feature 508. Specifically, the shaded square of the graphical feature 508 overlaps with the first stroke of the character of the text string 504. This is an example of an overlapping text string character error.

The text string "Name:" includes characters 555A, 555B, 555C, 555D and 555E corresponding to the letters "N," "a," "m," and "e" and the punctuation mark ":.", respectively. The characters 555A, 555B, 555C, 555D and 555E have different changed foreground colors 505A, 505B, 505C, 505D and 505E, respectively. The characters 555A, 555B, 555C, 555D and 555E similarly have different changed background colors 553A, 553B, 553C, 553D and 553E, respectively. Each of the colors 505A, 505B, 505C, 505D, 505E, 553A, 553B, 553C, 553D and 553E is unique within the layout 500 of which the text string 504 appears. The text string 504 with the corresponding color scheme is designated with the reference numeral 580.

Likewise, for the text string "Test Type:" 506, each of the characters for the text string have different foreground and background colors. The text string 506 with the corresponding color scheme is designated with the reference numeral 590 for future reference. The graphical feature "■" 508 represented as a shaded square has a color 55F. Because the colors 50 and 55 are each unique within the layout, the color 560 is different than the colors 50 and 55. The underline "_____" 515 and underline "_____" 525 are also assigned different colors.

The GUI feature 502, which represents a web component includes web component features including top and bottom horizontal sides, 510 and 530, respectively, and left and right vertical sides, 540 and 520, respectively. Each of the top and bottom horizontal sides and the left and right vertical sides is also assigned a different color.

FIG. 5B illustrates the HTML markup code 550 corresponding to the web component of the example webpage of FIG. 5A. As stated previously, the GUI feature 502 represents a web component. Each feature of the web component is assigned a different or a unique color. As illustrated in the HTML markup code 550 at line 1, "border-bottom-color: #8C2B34," the color of the bottom horizontal side 530 is changed to a color that is dark moderate red. At line 2, "border-top-color: #74B47B," the color of the top horizontal side 510 is changed to a color that is slightly desaturated lime green. At line 3, "border-right-color: #5C4CC2," the color of the right vertical side 520 is changed to a color that is moderate blue. At line 4, "border-left-color: #44D51A," the color of the left vertical side 540 is changed to a color that is strong lime green.

FIG. 5C illustrates the HTML markup code 560 corresponding to the text component of the example webpage of FIG. 5A. Each feature of the text component is assigned a different or a unique color. As illustrated in the HTML markup code 560 at line 1, "mark style="color: #9ADEAE; background-color: #827606">N</mark," the foreground color for the letter "N" is changed to a color that is lime green and the background color for the letter "N" is changed to a color that is dark yellow (olive tone). At line 2, "mark style=" color: #6A0E4D; background-color: #529794">a</mark," the foreground color for the letter "a" is changed to a color that is very dark pink and the background color for the letter "a" is changed to a color that is dark moderate cyan. At line 3, "mark style="color: #3A2FDB; background-color: #22B833">m</mark," the foreground color for the letter "m" is changed to a color that is bright blue and the background color for the letter "m" is changed to a color that is strong lime green. At line 4, "mark style="color: #0A507A; background-color #EFD9C1">e</mark," the foreground color for the letter "e" is changed to a color that is dark blue and the background color for the letter "e" is changed to a color that is light grayish orange. At line 5, "mark style=" color: #D77119; background-color: #BF0960">:</mark," the foreground color for the punctuation mark ":" is changed to a color that is strong orange and the background color for the punctuation mark ":" is changed to a color that is strong pink. According to embodiments of the present disclosure, the unique color assigned to each of the features in the text components and the web components is based on the location of the features within the text and web components and also based on the location of the text and web components in the Xpath of the DOM tree. In other words, the unique color is assigned to each feature of the node (e.g., the text component and/or the web component) based on a position of each feature within the node and based on a position of each node within the data object model.

Moreover, by changing the foreground and the background colors for each of the text components, the training efficiency is greatly improved, and fewer screenshots are needed for training as discussed in greater detail below. Furthermore, by changing the colors of the features of the web component such as GUI feature 502, also improves the training efficiency for detecting errors in webpage layouts. As more information is provided in the deep learning engine, the better the deep learning engine is trained.

Figure 6A:
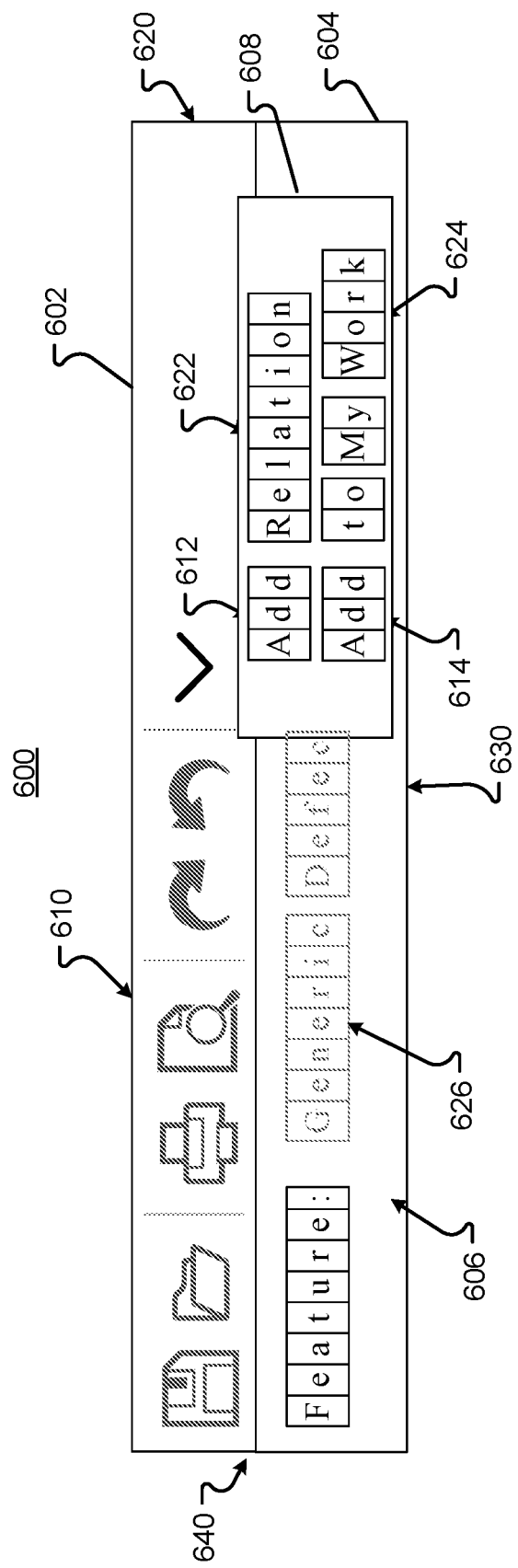
FIG. 6A illustrates another example layout of a webpage used in detecting errors in the webpage according to an embodiment of the present disclosure.

FIG. 6A illustrates another example layout 600 of a webpage used in detecting errors in the webpage according to an embodiment of the present disclosure. In FIG. 6A, a layout 600 includes a toolbar 802, a GUI feature 604 and a drop-down window 608. The GUI 604 feature includes the text string "Feature: Genetic Defec" 606 and the drop-down menu 608 includes the text string "Add Relation" 612 and the text string "Add to My Work" 614. Text string 606 is partially covered by the drop-down menu 608. The text stung should read "Feature: Generic Defects." This error should not be treated as a truncation error as discussed above with FIG. 1, but instead, this error should be treated as a fake layout issue where the text string 606 is partially covered by a web component (e.g., the drop-down menu 608). In other words, this error involves a text component (i.e., text string 606) and a web component i.e., (drop-down menu 608). Although, not labeled in the drawings, each of the features of the text strings 606, 612 and 622 are assigned different or unique colors. Like FIG. 5A, the foreground and background colors for each of the characters in the text strings 606, 612 and 622 is changed. The text string 606 with the changed color scheme is designated with the reference numeral 625, the text string 612 with the change color scheme is designated with the reference numeral 622 and the text string 614 with the changed color scheme is designated with the reference numeral 624.

FIG. 6B illustrates the HTML markup code 650 corresponding to the web component of the example webpage of FIG. 6A. The drop-down menu 608 represents a web component. Each feature of the web component is assigned a different or a unique color. As illustrated in the HTML markup code 650 at line 1, "border-bottom-color: #6A6401," the color of the bottom horizontal side 630 is changed to a color that is very dark yellow (olive tone). At line 2, "border-top-color: #52ED48," the color of the top horizontal side 610 is changed to a color that is soft lime green. At line 3, "border-right-color: #3A858F," the color of the right vertical side 620 is changed to a color that is dark moderate cyan. At line 4, "border-left-color: #221DD6," the color of the left vertical side 640 is changed to a color that is strong blue.

FIG. 6C illustrates the HTML markup code 660 corresponding to the text component of the example webpage of FIG. 6A. FIG. 6C illustrates the HTML markup code 660 corresponding to the text component of the example webpage of FIG. 6A. Each feature of the text component is assigned a different or a unique color. As illustrated in the HTML markup code 660 at line 1, "mark style="color: #711A64; background-color: #59A3AB">G</mark," the foreground color for the letter "G" is changed to a color that is very dark magenta and the background color for the letter "G" is changed to a color that is dark moderate cyan. At line 2, "mark style="color: #413B03; background-color: #29C44A">e</mark," the foreground color for the letter "e" is changed to a color that is very dark yellow (olive tone) and the background color for the letter "e" is changed to a color that is strong lime green. At line 3, "mark style="color: #115C91; background-color: #F6E5D8">n</mark," the foreground color for the letter "n" is changed to a color that is dark blue and the background color for the letter "n" is changed to a color that is light grayish orange. At line 4, mark style="color: #DE7D30; background-color: #C61577">i</mark," the foreground color for the letter "i" is changed to a color that is bright orange and the background color for the letter "i" is changed to a color that is strong pink. At line 5, "mark style="color: #AE9EBE; background-color: #963616">r</mark," the foreground color for the letter "r" is changed to a color that is greyish violet and the background color for the letter "r" is changed to a color that is dark red. At line 6, "mark style="color: #7EBF5D; background-color: #6657A4">i</mark," the foreground color for the letter "i" is changed to a color that is moderate green and the background color for the letter "i" is changed to a color that is dark moderate blue. At line 7, "mark style="color: #4EEOEB; background-color: #697843">c</mark," the foreground color for the letter "c" is changed to a color that is soft cyan and the background color for the letter "c" is changed to a color that is mostly desaturated dark green. At line 8, there is a space. Therefore, there is no color change. At line 9, "mark style="color: #1E108A; background-color: #0699D1">D</mark," the foreground color for the letter "D" is changed to a color that is dark blue and the background color for the letter "D" is changed to a color that is strong blue. At line 10, "mark style="color: #EB3129; background-color: #D3BA70">e</mark," the foreground color for the letter "e" is changed to a color that is bright red and the background color for the letter "e" is changed to a color that is slightly desaturated orange. At line 11, "mark style="color: #BB52B7; background-color: #A3DBOF">f</mark," the foreground color for the letter "f" is changed to a color that is moderate magenta and the background color for the letter "f" is changed to a color that is vivid green. At line 12, "mark style="color: #8B7356; background-color: #730B9D">e</mark," the foreground color for the letter "e" is changed to a color that is desaturated orange and the background color for the letter "e" is changed to a color that is dark violet. At line 13, "mark style=" color: #EB94E4; background-color: #432C3C">c</mark," the foreground color for the letter "c" is changed to a color that is very soft magenta and the background color for the letter "c" is changed to a color that is very dark greyish purple. At line 14, "mark style="color: #2BB583; background-color: #134DCA">t</mark," the foreground color for the letter "t" is changed to a color that is lime green and the background color for the letter "t" is changed to a color that is strong blue. At line 15, "mark style="color: #F8D622; background-color: #E06E69">s</mark," the foreground color for the letter "s" is changed to a color that is vivid yellow and the background color for the letter "s" is changed to a color that is soft red.

According to embodiments of the present disclosure, the unique color assigned to each of the features in the text components and the web components is based on the location of the features within the text and web components and also based on the location of the text and web components in the Xpath of the DOM tree. In other words, the unique color is assigned to each feature of the node (e.g., the text component and/or the web component) based on a position of each feature within the node and based on a position of each node within the data object model.

Moreover, by changing the foreground and the background colors for each of the text components, the training efficiency is greatly improved, and fewer screenshots are needed for training as discussed in greater detail below. Furthermore, by changing the colors of the features of the web component such as the drop-down menu 608, also improves the training efficiency for detecting errors in webpage layouts. As more information is provided in the deep learning engine, the better the deep learning engine is trained.

Figure 7:
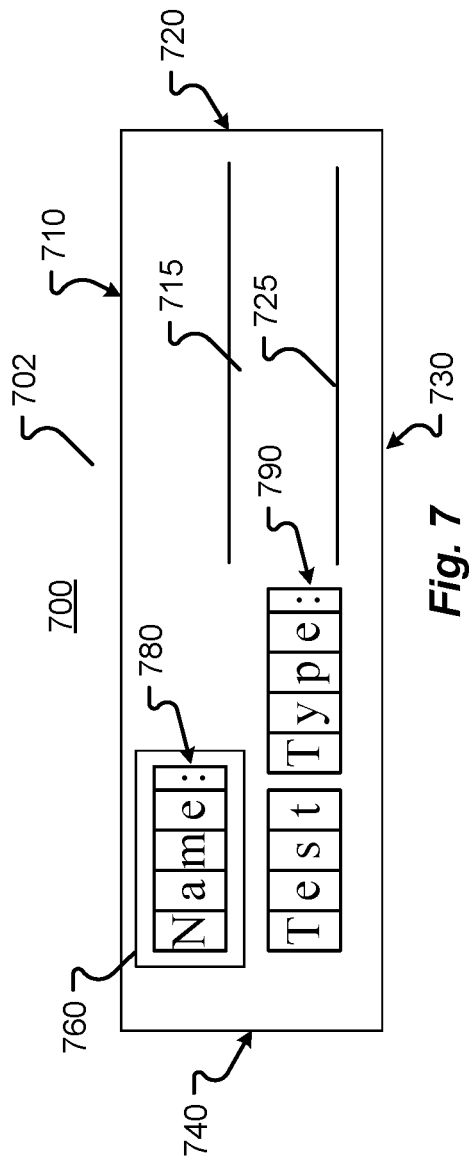
FIG. 7 illustrates an example snapshot of the layout of the webpage illustrated in FIG. 5A used in detecting errors in the webpage according to an embodiment of the present disclosure.

FIG. 7 illustrates an example snapshot 700 of the layout of the webpage illustrated in FIG. 5A used in detecting errors in the webpage according to an embodiment of the present disclosure. As illustrated in FIG. 7, the snapshot 700 identifies the error in the webpage layout with the box 760. The error is further labeled or classified as a truncation error or an icon overlapping text error.

Figure 8:
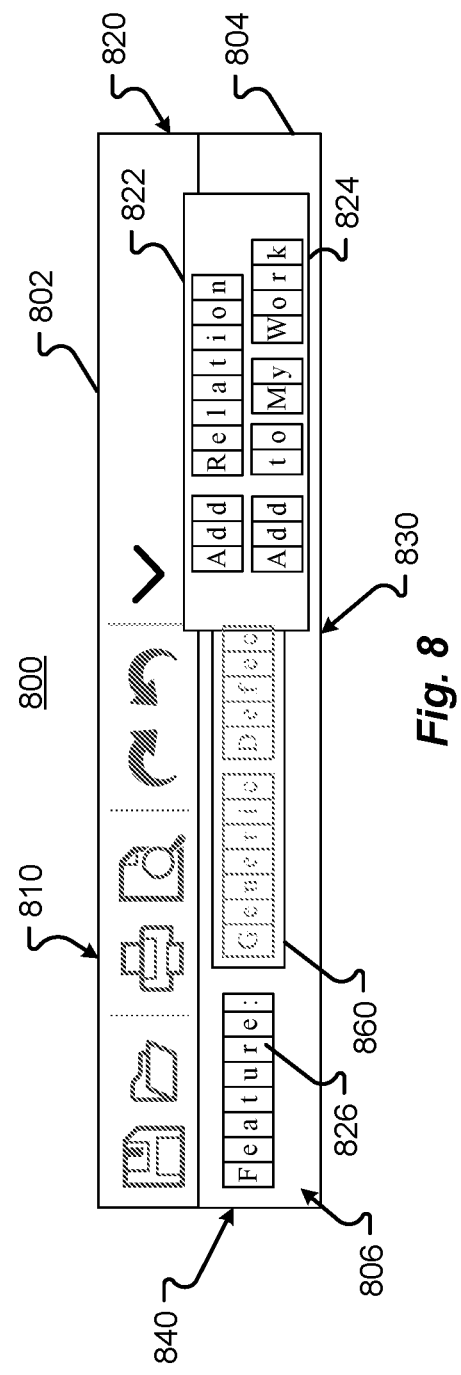
FIG. 8 illustrates an example snapshot of the layout of the webpage illustrated in FIG. 6A used in detecting errors in the webpage according to an embodiment of the present disclosure.

FIG. 8 illustrates an example snapshot 800 of the layout of the webpage illustrated in FIG. 6A used in detecting errors in the webpage according to an embodiment of the present disclosure. As illustrated in FIG. 8 the snapshot 800 identifies the error in the webpage layout with the box 860. The error is further labeled or classified as a fake truncation error or a menu covers text end error.

FIG. 9 illustrates an example snapshot 900 of the layout out of the webpage illustrated in FIG. 6A and the corresponding HTML markup codes corresponding to the web and text components 950 and 960, respectively, illustrated in FIGS. 6B and 6C used in detecting errors in the webpage according to an embodiment of the present disclosure. As illustrated in FIG. 9, both the snapshot 900 and corresponding HTML markup codes corresponding to the web and text components 950 and 960 are sent as input to a deep learning engine for further processing.

Figure 10A:
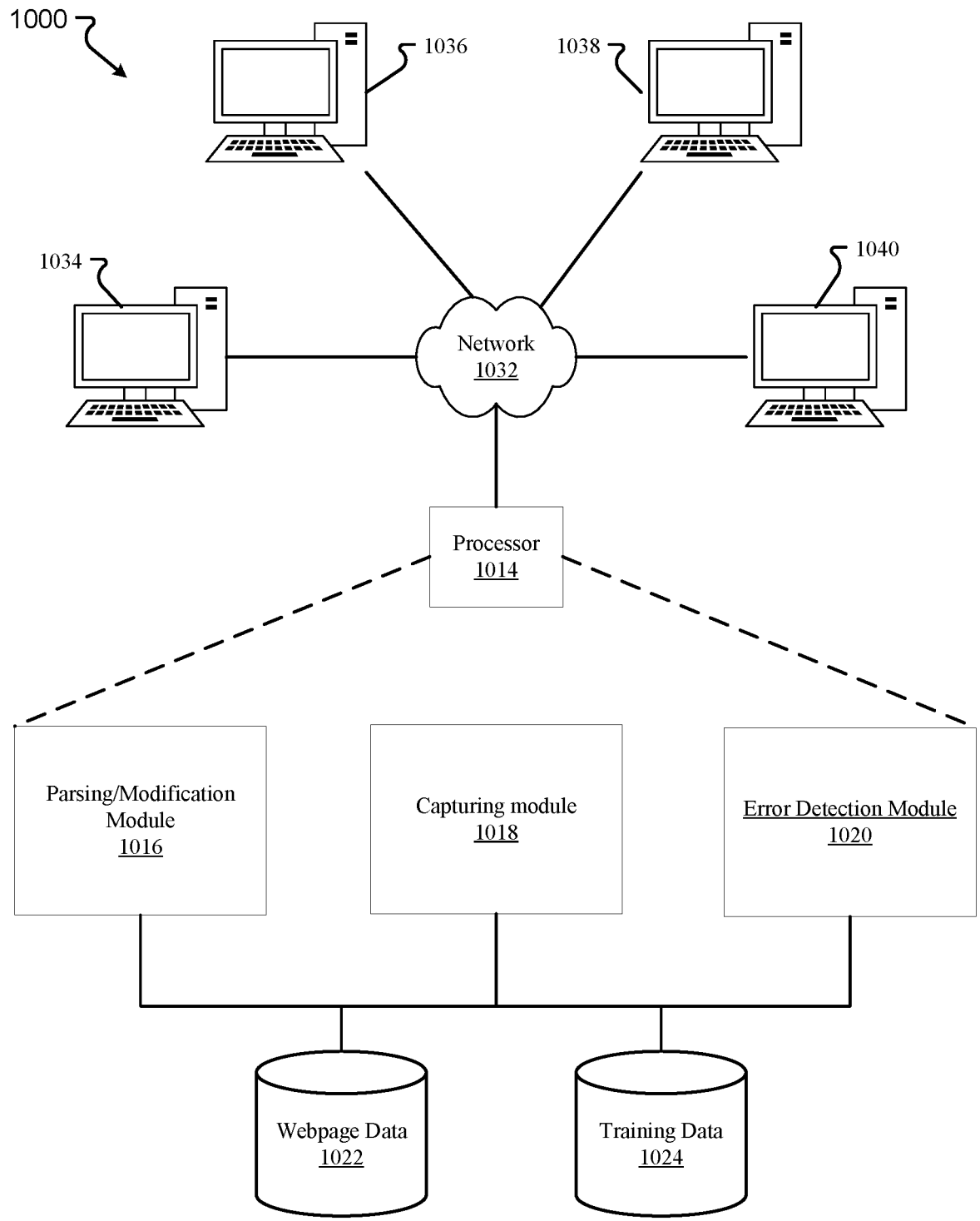
FIG. 10A is a diagram illustrating an example system for detecting errors in webpage layouts according to an embodiment of the present disclosure.

FIG. 10A is a diagram illustrating an example system 1000 for detecting errors in webpage layouts in according to an embodiment of the present disclosure. A server system provides data retrieval, project task analysis, and project monitoring. The server system includes one or more processors 1014, software components, and databases that can be deployed at various geographic locations or data centers. The server system software components include a parsing/modification module 1016, a capturing module 1018, and an error detection module 1020. The software components can include subcomponents that can execute on the same or on different individual data processing apparatus. The server system databases include webpage data 1022 and training data 1024. The databases can reside in one or more physical storage systems. The software components and data will be further described below.

An application having a graphical user interface can be provided as an end-user application to allow users to exchange information with the server system. The end-user application can be accessed through a network 1032 (e.g., the Internet and/or a local network) by users of client devices 1034, 1036, 1038, and 1040. Each client device 1034, 1036, 1038, and 1040 may be, for example, a personal computer, a smart phone, a tablet computer, or a laptop computer. In various examples of the present disclosure, the client devices 1034, 1036, 1038, and 1040 are used to access the systems and methods described herein, to detect errors in webpage layouts.

Although FIG. 10A depicts the parsing/modification module 1016, the capturing module 1018, and the error detection module 120 as being connected to the databases (i.e., webpage data 1022 and training data 1024), the parsing/modification module 1016, the capturing module 1018, and/or the error detection module 120 are not necessarily connected to one or both of the databases. In general, the error detection module 1020 includes one or more classifiers that can be trained using the training data 1024. Information about webpages processed using the system 1000 can be stored in the webpage data 1022. For example, the webpage data 1022 can include information related to a layout and/or a content of one or more webpages.

In general, the parsing/modification module 1016 is used to parse a data object model associated with a webpage to change an original color scheme for each node of the data object model. Each node of the data object model corresponds to a display feature of a layout of the webpage and each node includes one or more features. The parsing/modification module 1016 is also used to generate a modified data object model by replacing the original color scheme for each node with a calculated color scheme. The calculated color scheme assigns a unique color code to each feature of the node, different than an original color code for each feature of the node, based on a position of each feature within the node and based on a position of each node within the data object model.

The capturing module 1018 is generally used to display the layout of the webpage using the modified data object model and to capture an image of the layout of the webpage as displayed.

In general, the detection module 1020 uses a machine learning classifier or other predictive model to identify errors in the webpage layout. The machine learning classifier or other predictive model can be trained using the training data 1024, which may be or include, for example, one or more features related to previously detected errors. In some embodiments of the present disclosure, the training data 1024 is used to train the machine learning classifier how to recognize errors in webpage layouts based on previously detected and classified errors.

Figure 10B:
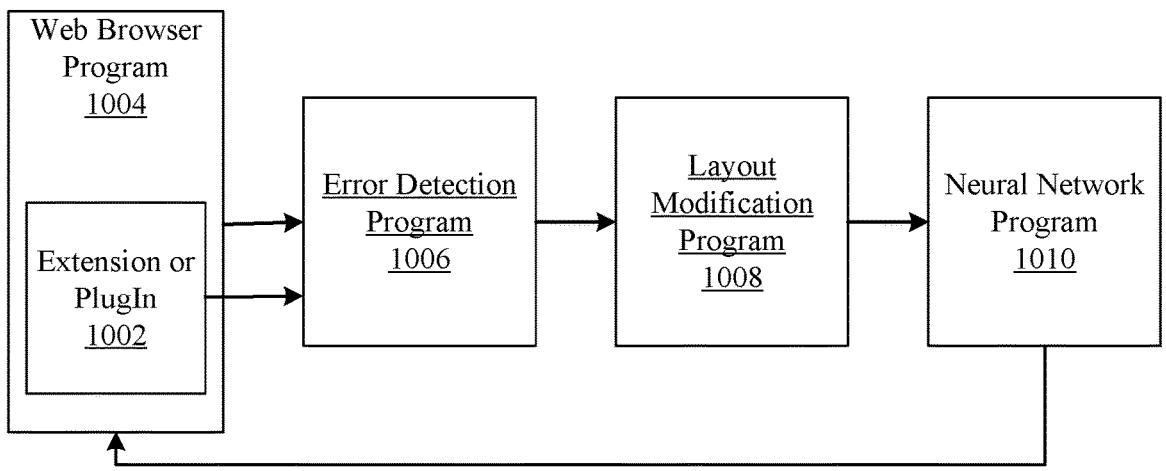
FIG. 10B is a diagram illustrating another example system for detecting errors in webpage layouts according to an alternative embodiment of the present disclosure.

FIG. 10B is a diagram illustrating an example system 1050 for detecting errors in webpage layouts according to an alternative embodiment of the present disclosure. Other systems can also be employed for detecting errors in webpage layouts, however. The system 1050 specifically pertains to detecting errors within layouts of webpages, which may be specified in a markup language. The system 1050 includes an extension or plugin 1002 executing within a web browser program 1004, as well as an error detection program 1006. The system 1050 can further include a layout modification program 1008 and a neural network program 1010.

The extension or plugin 1002 generates a modified data object model by replacing, within the data object model associated with the webpage, the original color scheme for each node with a calculated color scheme, wherein the calculated color scheme assigns a unique color code to each feature of the node, different than an original color code for each feature of the node, based on a position of each feature within the node and based on a position of each node within the data object model. The web browser program 1004 then displays the resultantly changed layout. The error detection program 1006 captures an image of the layout as displayed, and from the extension or plugin 1002 receives specification of the colors to which the features of the node have been changed.

The error detection program 1006 detects layout errors, such as the truncation, reversal, overlap and fake layout errors of FIGS. 1-4, by detecting the specified colors within the captured image. The error detection program 1006 may provide a notification of any detected such errors, which the layout modification program 1008 may then correct. This process can be iteratively repeated until errors are detected. The layout modification program 1008 may automatically modify the layout to resolve the errors without user interaction, or a user may instead manually modify the layout. The neural network program 1010 trains one or more classifiers to detect errors in webpage layouts and uses the one or more trained classifiers to detect errors in subsequent webpage layouts as discussed below in FIG. 11.

In one implementation, the extension or plugin 1002 changes the foreground and background colors of each non-space character of each text string within a layout. More generally, the foreground and/or background color of each of one or more characters of each text string can be changed. As noted above, the color of a character is defined as the character's foreground color, as the character's background color, or as both the character's foreground and background colors. Characters as defined herein mean non-space characters.

The foreground of a character of a text string is the color of the actual character itself, such as the lines, curves, and so on, making up the character. The background of the character is the rectangular space against which the foreground of the character is displayed. For a given font size of a given font, the background of each character may be identical in height. The width of each character, by comparison, may vary if the font is a proportional font and may be identical if the font is a non-proportional font.

The extension or plugin 1002 can change the color of each character of each text string to a unique color within the layout. That is, no other feature of the layout has the color to which a character of a text string is changed; the color otherwise does not appear within the layout. If both the foreground and background colors of each such character are changed, the foreground color of each character is unique within the layout, as is the background color of each character.

In such an implementation, the extension or plugin 1002 can change the color of a character of a text string of a layout by wrapping the character within a "mark" HTML feature, and by setting "color" and "background" inline cascading style sheet (CSS) properties within the feature to unique color values. The extension or plugin 1002 can change the color of a character of a text string of a layout in another manner as well.

The extension or plugin 1002 sends the specification of the colors to which it has changed each character to the error detection program 1006 which receives this specification of the changed colors. The web browser program 1004 displays the layout as has been modified by the extension or plugin 1002, which can include first rendering the layout. The error detection program 1006 then captures an image of the layout that has been displayed, such as by taking a screenshot of a window of the web browser program 1004 in which the webpage having the layout has been displayed.

The error detection program 1006 detects errors in the text strings within the layouts as displayed, by detecting the changed colors of the non-space characters of the text strings within the captured image of the displayed layout. The error detection program 1006 does not actually detect the characters themselves—e.g., the program 1006 does not perform OCR or any other character detection technique. Rather, the error detection program 1006 detects, within the captured image, just the colors to which the characters have been changed within the layout, and not the characters themselves.

The types of text string errors are truncation errors, reversal errors, and overlap errors. If the color to which a character of a text string has been changed is not detected within the captured image, then a truncation error of the string is detected. This is why in one implementation just the colors of non-space characters are changed. If a text string ends with a space, and the space is truncated, there is no meaningful difference as compare to if the space was not truncated. Because the color of the space is not changed, the absence of the space within the captured image is not detected, and accordingly no truncation error is detected.

If the detected color to which the first character of a text string has been changed is out of order relative to the color to which the last character of the string has been changed, then a reversal error of the string is detected. For example, if the text string is in a right-to-left language like Hebrew or Arabic, then the changed color of the first character should appear to the right of the changed color of the last color. By comparison, if the text string is in a left-to-right language like English, then the changed color of the first character should appear to the left of the changed color of the last color.

Whether a text string is in a right-to-left human language or a left-to-right human language—so that whether there is a reversal error in the displayed text string can be detected can be determined in a number of different ways. For example, the layout itself may specify the language of a text string.

If the changed background color of a character of a text string contains any color other than the changed foreground color to the character, then an overlap error is detected. For instance, the overlap may be between the character and a graphical feature of the layout having the additionally detected color Similarly, if the changed foreground color of a first text string overlaps the changed foreground color of a character of a second text string has been changed, then an overlap error of the first string and the second string is detected.

The error detection program 1006 can output an alert indicating the errors that have been detected. The layout modification program 1008 can instead or additionally modify the layout to correct the detected errors. For example, the error detection program 1006 can notify the layout modification program 1008 of the detected errors. Based on this information, the layout modification program 1008 may modify the layout, such as in an automated manner, to correct the detected errors. For example, the displayed length of the text sting may be increased, the characters may be reversed, the location of the text string may be moved, and/or the like. In this case, the layout modification program 1008 may at least partially reside on the computing device that provides the web browser program 1004.

Figure 11:
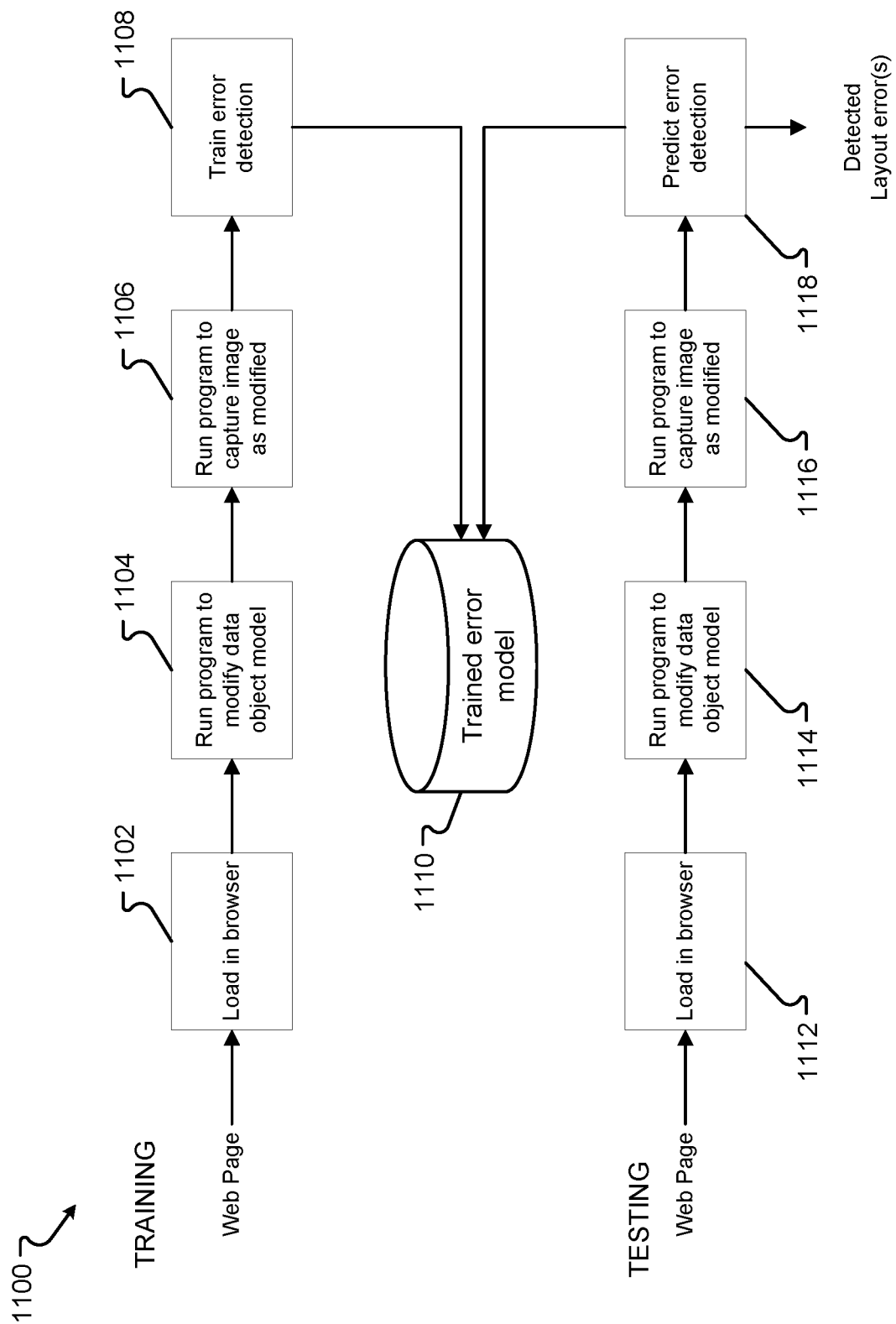
FIG. 11 is a diagram illustrating a flow chart of an example method for training a classifier to detect errors in webpage layouts and using the trained classifier to detect errors in subsequent webpage layouts according to an embodiment of the present disclosure.

FIG. 11 is a diagram illustrating a flowchart of an example method 1100 for training a classifier to detect errors in webpage layouts and using the trained classifier to detect errors in subsequent webpage layouts according to an embodiment of the present disclosure. To generate the training data 1024, a known or example webpage can be loaded into a browser or similar application (step 1102). The parsing/modification module 1016 can be used to modify the data object model of the known or example webpage (step 1104). The capturing module 1018 can be used to display the layout of the webpage using the modified data object model and to capture an image of the layout of the webpage as displayed (step 1106). One or more webpage layout errors can be identified manually and/or automatically, for example, using a classifier or other predictive model. Once webpage layout errors have been determined, layout errors can be added to the training data 1024 and used to train one or more classifiers 1110 or predictive models in the error detection module 1020 (step 1108). In some embodiments of the present disclosure, a wide variety of training data, is generally preferable and improves the ability of the classifier to distinguish different types of categories of web page layout errors.

Once the one or more classifiers 1100 have been trained, the systems and methods described herein can be used to determine layout errors for other webpages. For example, a new webpage (e.g., a webpage for which a layout check has not been performed) can be loaded into a browser or similar application (step 1112). The parsing/modification module 1016 can be used to modify the data object model of the known or example webpage (step 1114). The capturing module 1018 can be used to display the layout of the webpage using the modified data object model and to capture an image of the layout of the webpage as displayed (step 1116). The detected errors can then be input into the one or more classifiers 1110 (e.g., included in or accessed by the error detection module 1020), and the error detection module 1020 can detect layout errors of the new webpage (step 1118). According to some embodiments of the present disclosure, the error detection module 1020 provides a probability or score representing a likelihood that the detected layout error is correct. If the probability exceeds a threshold (e.g., 80% or 90%) for a detected layout error, the detected layout error can be considered to be correct. In certain implementations of the present disclosure, the error detection module 1020 outputs a listing of alternative layout errors that the detected layout error might be.

Figure 12:
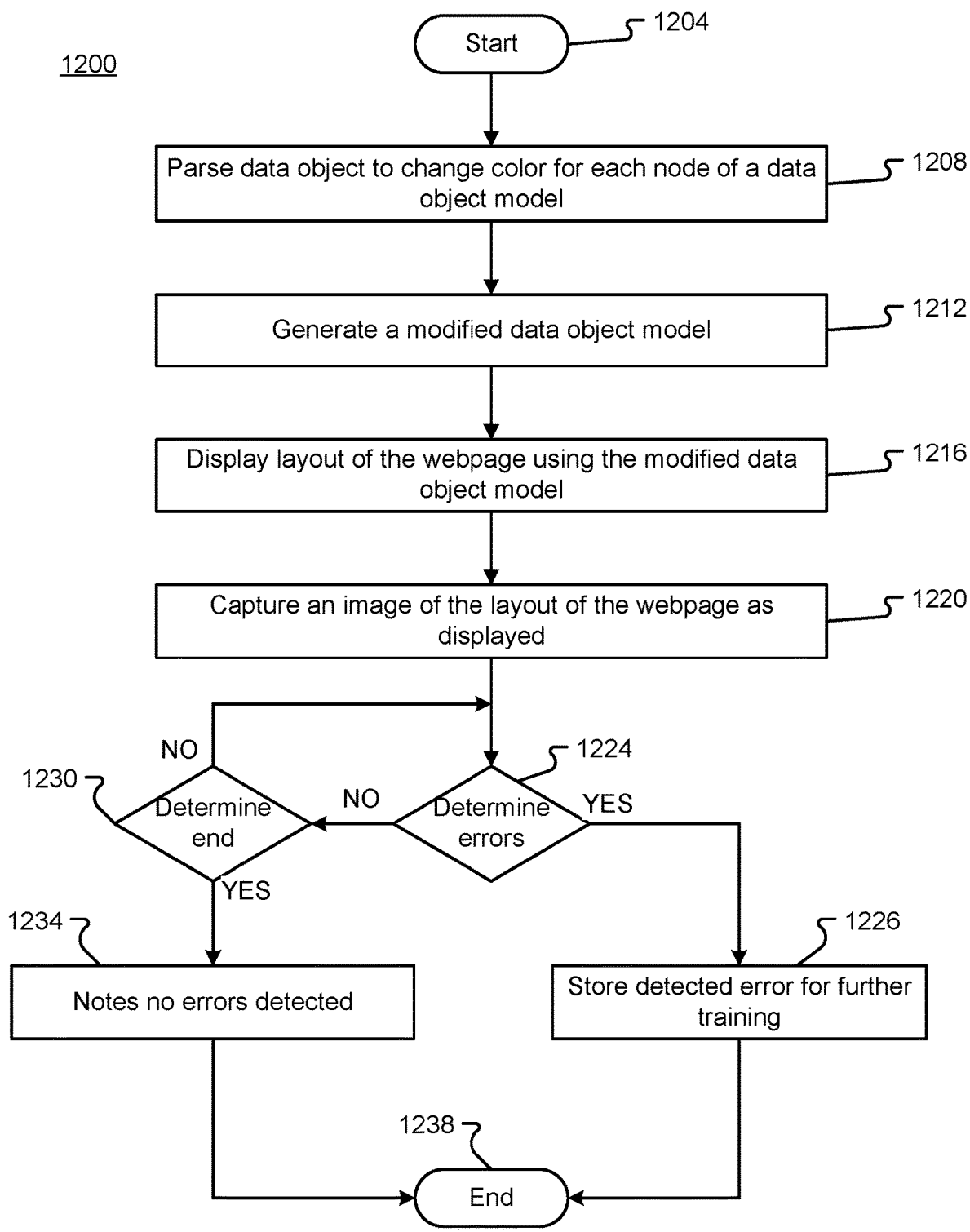
FIG. 12 is a flowchart of an example method for detecting errors in webpage layouts according to an embodiment of the present disclosure.

FIG. 12 is a flowchart of an example method 1200 for detecting errors in webpage layouts according to an embodiment of the present disclosure. While a general order of the steps of method 1200 is shown in FIG. 12, method 1200 can include more or fewer steps or can arrange the order of the steps differently than those shown in FIG. 12. Further, two or more steps may be combined into one step. Generally, method 1200 starts with a START operation at step 1204 and ends with an END operation at 1238. Method 1200 can be executed as a set of computer-executable instructions executed by a data-processing system and encoded or stored on a computer readable medium. Hereinafter, method 1200 shall be explained with reference to systems, components, modules, software, data structures, user interfaces, etc. described in conjunction with FIGS. 10, 11 and 13-15.

Method 1200 starts with the START operation at step 1204 and proceeds to step 1208, where the processor 1014 parses a data object model associated with a webpage to change an original color scheme for each node of the data object model. Each node corresponds to a display feature of a layout of the webpage and each node includes at least one feature. After parsing the data model at step 1208, method 1200 proceeds to step 1212, where the processor 1014 generates a modified data object model by replacing, within the data object model associated with the webpage, the original color scheme for each node with a calculated color scheme. The calculated color scheme assigns a unique color code to each feature of the node, different than an original color code for each feature of the node, based on a position of each feature within the node and based on a position of each node within the data object model. After generating a modified data object model at step 1212, method 1200 proceeds to step 1216, where the processor 1014 displays the layout of the webpage using the modified data object model. After displaying the layout of the webpage at step 1216, method 1200 proceeds to step 1220 where the processor 1014 captures an image of the layout of the webpage as displayed. After capturing an image of the layout of the webpage as displayed at step 1220, method 1200 proceeds to decision step 1224 where it is determined if any layout errors have been detected. If no layout errors have been detected (NO) at decision step 1224, method 1200 proceeds to decision step 1230 where it is determined if this is the last webpage. If this is not the last webpage (NO) at decision step 1230, method 1200 returns to step 1224. If this is the last webpage (YES) at decision step 1230, method 1200 proceeds to step 1234 where the processor 1014 notes that there are no errors detected. If there are errors detected (YES) at decision step 1224, method 1200 proceeds to step 1226 where the detected error(s) are stored for further training. After the error(s) are stored for further training at step 1226 or after the processor notes that there are no layout errors at step 1234, method 1200 ends at END operation 1238.

Figure 13:
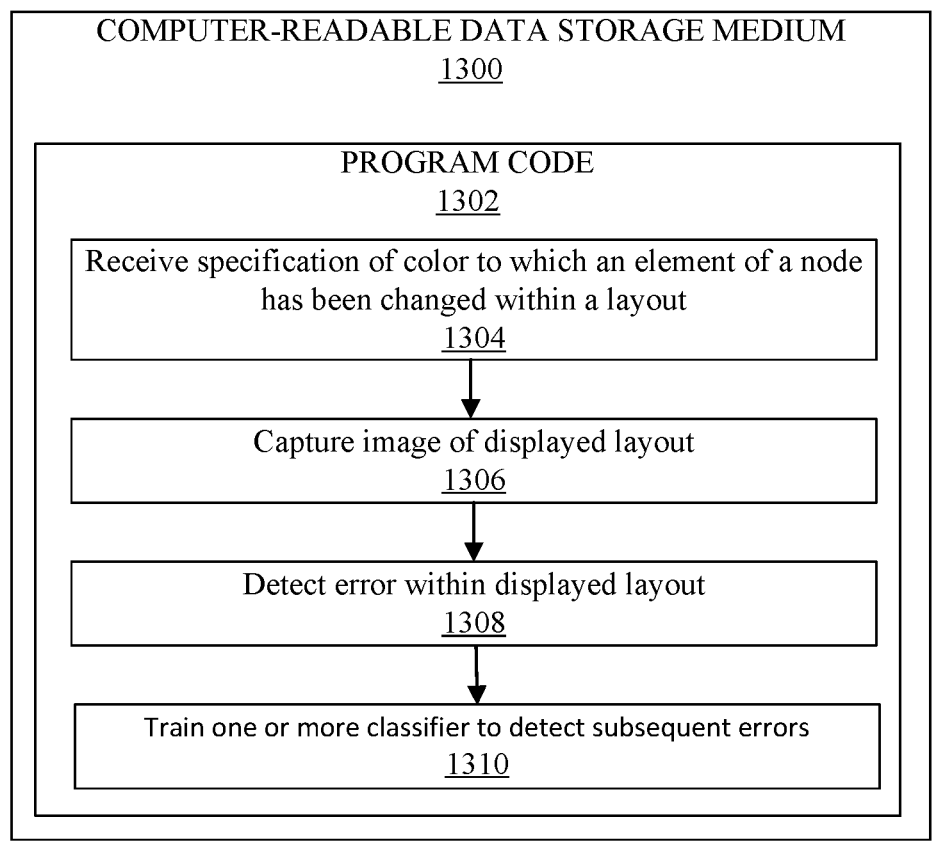
FIG. 13 is a diagram of an example computer-readable medium data storage medium for detecting errors in webpage layouts according to an embodiment of the present disclosure.

FIG. 13 is a diagram of an example computer-readable medium data storage medium 1300 for detecting errors in webpage layouts according to an embodiment of the present disclosure. The computer-readable data storage medium 1300 stores program code 1302 executable by a processor to perform processing. The processing may be a processor of a computing system, like that of FIGS. 10A and 10B. The processing is consistent with but more general than the method of FIG. 12. The processing includes receiving specification of a color to which a feature of a node has been changed within a layout (1304) and capturing an image of the layout as displayed (1306). The processing includes detecting an error within the displayed layout (1308) and training one or more classifiers to detect errors in webpage layouts and using the one or more trained classifiers to detect errors in subsequent webpage layouts (1310).

Figure 14:
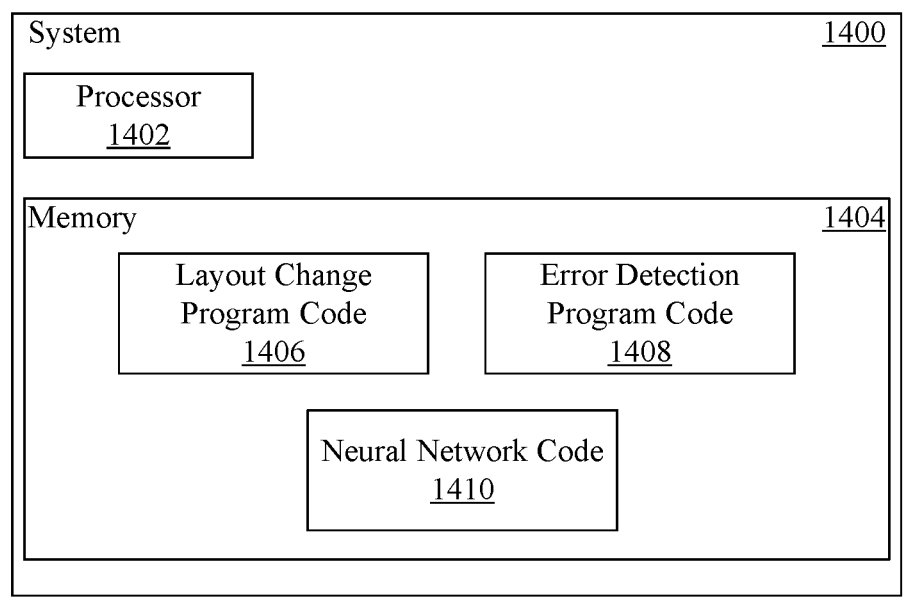
FIG. 14 is a diagram of an example system for detecting errors in webpage layouts according to an embodiment of the present disclosure.

FIG. 14 is a diagram of an example system 1400 for detecting errors in webpage layouts according to an embodiment of the present disclosure. The system 1400 is consistent with but more general than the systems of FIGS. 10A and 10B. The system 1400 includes a processor 1402, and a memory 1404 storing program code executable by the processor 1402. The program code includes layout change program code 1406 to change a color of a feature of a node within a layout. For instance, the layout change program code 1406 may be an extension or plugin code executable within a web browser program that is executable by the processor and that is to display the layout.

The program code also includes error detection program code 1408. The error detection program code 1408 is to receive specification of the changed color from the layout change program code 1406. The error detection program code 1408 captures an image of the layout as it is displayed. The error detection program code 1408 detects an error within the layout as displayed by detecting the changed colors of the features of the node within the captured image. The program code further includes neural network program code 1410. The neural network program code 1410 trains one or more classifiers to detect errors in webpage layouts and uses the one or more trained classifiers to detect errors in subsequent webpage layouts.

Figure 15:
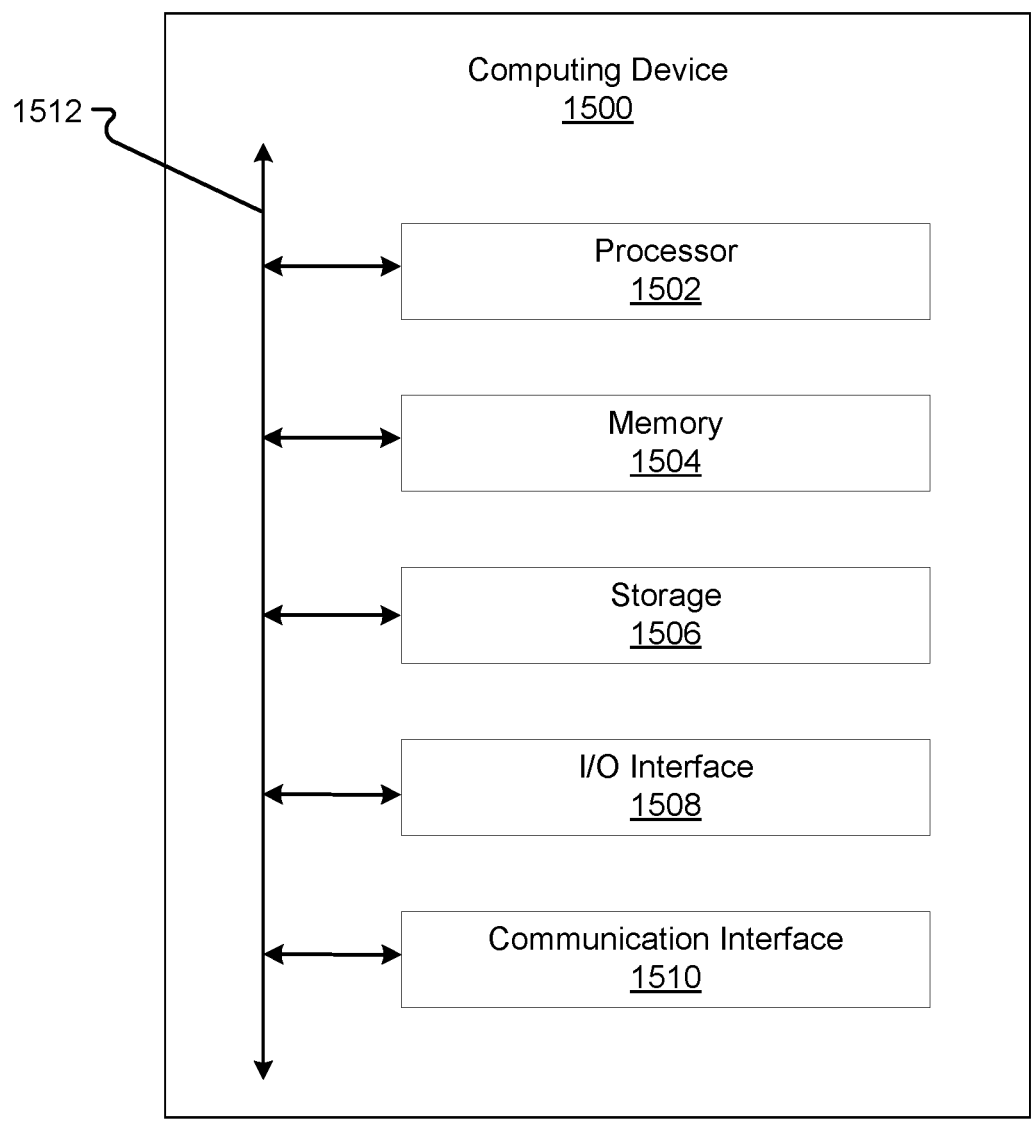
FIG. 15 is a diagram of an example computing device for detecting errors in webpage layouts according to an embodiment of the present disclosure.

FIG. 15 is a diagram of an example computing device 1500 for detecting errors in webpage layouts according to an embodiment of the present disclosure. One will appreciate that the parsing/modification module 1016, the capturing module 1018 and detecting module 1020 illustrated in FIG. 10A can be implanted on implementations of the computing device 1500. As shown by FIG. 15, the computing device 1500 can include a processor 1502, memory 1504, a storage device 1506, an input or output ("I/O") interface 1508, and a communication interface 1510. In certain embodiments of the present disclosure, the computing device 1500 can include fewer or more components than those shown in FIG. 15. Components of computing device 1500 shown in FIG. 15 will now be described in additional detail.

In particular embodiments of the present disclosure, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1606 and decode and execute them.

The computing device 1500 includes memory 1504, which is coupled to the processor(s) 1502. The memory 1504 may be used for storing data, metadata, and programs for execution by the processor(s) 1502. The memory 1504 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1504 may be internal or distributed memory. In one or more embodiments, the memory 1504 stores or comprises the data storage.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices. In one or more embodiments of the present disclosure, the storage device 1506 stores or includes the data storage.

The computing device 1500 also includes one or more I/O devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a stylus or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments of the present disclosure, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    parsing a data object model associated with a webpage to change an original color scheme for each node of the data object model,
    wherein each node corresponds to a display feature of a layout of the webpage, and
    wherein each node includes at least one feature;
    generating a modified data object model by replacing, within the data object model associated with the webpage, the original color scheme for each node with a calculated color scheme,
    wherein the calculated color scheme assigns a unique color code to each feature of the node, different than an original color code for each feature of the node, based on a position of each feature within the node and based on a position of each node within the data object model;
    displaying the layout of the webpage using the modified data object model;
    capturing an image of the layout of the webpage as displayed;
    detecting one or more errors on the captured image of the layout of the webpage;
    labelling and categorizing the detected one or more errors on the captured image of the layout of the webpage; and
    providing the labelled and categorized detected one or more errors as input to one or more classifiers of a neural network.

2. The method according to claim 1, wherein the step of detecting one or more errors in the layout of the webpage includes failing to identify at least one of the assigned unique color codes on the displayed layout of the webpage or identifying at least one of the assigned unique color codes at an incorrect position on the displayed layout of the webpage.

3. The method according to claim 1, further comprising generating a mapping that associates the assigned unique color code with the position of the feature within the node and the position of the node within the data object model.

4. The method according to claim 1, wherein the nodes include web components and text components and wherein the calculated color scheme further assigns a unique color code to each feature of the web component based on the position of the feature within the web component and the position of each web component node within the data object model and assigns a unique color code to each feature of the text component based on a position of each character within the text component and a position of each text component within the data object model.

5. The method according to claim 4, wherein the detected one or more errors on the captured image of the layout of the webpage include errors based on at least one text component and errors based on at least one text component and at least one web component.

6. The method according to claim 4, wherein each feature of the text component includes a foreground component and a background component and wherein the calculated color scheme further assigns a unique color code to each of the foreground component and the background component of the text component.

7. The method according to claim 1, further comprising:
receiving as output from the one or more classifiers a report of layout issues from a subsequent data object model associated with a subsequent webpage having similar layout errors identified by the one or more classifiers.

8. The method according to claim 1, further comprising outputting an alert or modifying the layout in an automated manner to correct any errors from the detected one or more errors on the captured image of the layout of the webpage.

9. The method according to claim 1, wherein the detected one or more errors on the captured image of the layout of the webpage at least include fake truncation errors or window covering text errors.

10. A non-transitory computer readable data storage medium comprising instructions that, when executed by at least one processor, cause a computing device to:
parse a data object model associated with a webpage to change an original color scheme for each node of the data object model,
wherein each node corresponds to a display feature of a layout of the webpage, and
wherein each node includes at least one feature;
generate a modified data object model by replacing, within the data object model associated with the webpage, the original color scheme for each node with a calculated color scheme,
wherein the calculated color scheme assigns a unique color code to each feature of the node, different than an original color code for each feature of the node, based on a position of each feature within the node and based on a position of each node within the data object model;
display the layout of the webpage using the modified data object model;
capture an image of the layout of the webpage as displayed;
detect one or more errors on the captured image of the layout of the webpage;
label and categorize the detected one or more errors on the captured image of the layout of the webpage; and
provide the labelled and categorized detected one or more errors as input to one or more classifiers of a neural network.

11. The non-transitory computer-readable data storage medium according to claim 10, wherein the instructions, when executed by the at least one processor, cause the computing device to generate a mapping that associates the assigned unique color code with the position of the feature within the node and the position of the node within the data object model.

12. The non-transitory computer-readable data storage medium according to claim 11, wherein the instructions, when executed by the at least one processor, cause the computing device to:
receive as output from the one or more classifiers a report of layout issues from a subsequent data object model associated with a subsequent webpage having similar layout errors identified by the one or more classifiers.

13. The non-transitory computer-readable data storage medium according to claim 10, wherein the instructions, when executed by the at least one processor, cause the computing device to output an alert or modify the layout in an automated manner to correct any errors from the detected one or more errors on the captured image of the layout of the webpage.

14. The non-transitory computer-readable data storage medium according to claim 10, wherein the detected one or more errors on the captured image of the layout of the webpage at least include fake truncation errors or window covering text errors.

15. A system, comprising:
a memory comprising a data object model of a webpage; and
computer readable instructions, that when executed by one or more processors, cause the system to perform the steps of:
parsing a data object model associated with a webpage to change an original color scheme for each node of the data object model,
wherein each node corresponds to a display feature of a layout of the webpage, and
wherein each node includes at least one feature;
generating a modified data object model by replacing, within the data object model associated with the webpage, the original color scheme for each node with a calculated color scheme,
wherein the calculated color scheme assigns a unique color code to each feature of the node, different than an original color code for each feature of the node, based on a position of each feature within the node and based on a position of each node within the data object model;
displaying the layout of the webpage using the modified data object model;
capturing an image of the layout of the webpage as displayed;
detecting one or more errors on the captured image of the layout of the webpage;
labelling and categorizing the detected one or more errors on the captured image of the layout of the webpage; and
providing the labelled and categorized detected one or more errors as input to one or more classifiers of a neural network.

16. The system according to claim 15, wherein the step of detecting one or more errors in the layout of the webpage includes failing to identify at least one of the assigned unique color codes on the displayed layout of the webpage or identifying at least one of the assigned unique color codes at an incorrect position on the displayed layout of the webpage.

17. The system according to claim 15, further comprising the step of generating a mapping that associates the assigned unique color code with the position of the feature within the node and the position of the node within the data object model.

18. The system according to claim 15, wherein the nodes include web components and text components and wherein the calculated color scheme further assigns a unique color code to each feature of the web component based on the position of the feature within the web component and the position of each web component node within the data object model and assigns a unique color code to each feature of the text component based on a position of each character within the text component and a position of each text component within the data object model.

19. The system according to claim 17, wherein the detected one or more errors on the captured image of the layout of the webpage include errors based on at least one text component and errors based on at least one text component and at least one web component.

20. The system according to claim 15, wherein the detected one or more errors on the captured image of the layout of the webpage at least include fake truncation errors or window covering text errors.

\* \* \* \* \*